(12) United States Patent
Lee et al.

(10) Patent No.: US 7,812,271 B2
(45) Date of Patent: Oct. 12, 2010

(54) COMPLEX BUTTON ASSEMBLY AND PORTABLE MULTIMEDIA DEVICE USING THE SAME

(75) Inventors: Seok Woo Lee, Gwangmyeong (KR); Kyung Yul Kim, Osan (KR)

(73) Assignee: LG Electronics Inc., Seoul (KR)

( * ) Notice: Subject to any disclaimer, the term of this patent is extended or adjusted under 35 U.S.C. 154(b) by 987 days.

(21) Appl. No.: 11/605,285

(22) Filed: Nov. 29, 2006

(65) Prior Publication Data

US 2007/0120821 A1    May 31, 2007

(30) Foreign Application Priority Data

Nov. 30, 2005 (KR) ............... 10-2005-0115604
Dec. 15, 2005 (KR) ............... 10-2005-0124021

(51) Int. Cl.
*H01H 9/00* (2006.01)

(52) U.S. Cl. ............. 200/5 R; 200/4; 200/14; 200/6 A (58) Field of Classification Search .......... 200/4, 200/5 R, 6 A, 14, 17 R, 18, 296; 341/20, 341/21, 22, 35; 345/156, 157, 161, 168, 345/169, 184; 434/178, 317
See application file for complete search history.

(56) References Cited

U.S. PATENT DOCUMENTS

| 4,861,950 | A | * | 8/1989 | Yanai et al. | 200/5 R |
|---|---|---|---|---|---|
| 4,866,221 | A | * | 9/1989 | Obermann et al. | 200/5 R |
| 5,412,165 | A | * | 5/1995 | Malone et al. | 200/5 R |
| 6,643,656 | B2 | * | 11/2003 | Peterson | 1/1 |
| 6,774,322 | B2 | * | 8/2004 | Morinishi et al. | 200/5 R |
| 6,864,879 | B2 | * | 3/2005 | Nojima et al. | 345/156 |
| 6,918,877 | B2 | * | 7/2005 | Hossack et al. | 600/447 |
| 6,984,793 | B1 | * | 1/2006 | Chew | 200/4 |
| 7,173,201 | B2 | * | 2/2007 | Fukaya et al. | 200/6 A |
| 7,385,589 | B2 | * | 6/2008 | Bartels et al. | 345/169 |
| 7,507,918 | B2 | * | 3/2009 | Kazama | 200/6 A |
| 7,511,235 | B2 | * | 3/2009 | Osada | 200/6 A |

* cited by examiner

*Primary Examiner*—Michael A Friedhofer
(74) *Attorney, Agent, or Firm*—Birch, Stewart, Kolasch & Birch, LLP (57) ABSTRACT

A complex button assembly and a portable multimedia device using the same. The complex button assembly is installed to an upper end of a case which defines an external appearance of the portable multimedia device. The complex button assembly is provided with a plurality of buttons to receive information on an operating state of the multimedia device. The complex button assembly is installed to face upwardly on the upper surface of the case or rearwardly and upwardly on the upper surface of the case such that a user can easily operate the portable multimedia device. In the complex button assembly, a button body having first and second button units is installed in a penetration portion of a button frame. A jog window is further formed in a middle portion of the button body in which a jog button is installed.

18 Claims, 8 Drawing Sheets

RELATED ART

COMPLEX BUTTON ASSEMBLY AND PORTABLE MULTIMEDIA DEVICE USING THE SAME

FIELD OF THE INVENTION

The present invention relates to a portable multimedia device, and more particularly, to a portable multimedia device capable of executing multimedia files stored therein while users carry the portable multimedia device with them.

BACKGROUND ART

Figure 7:
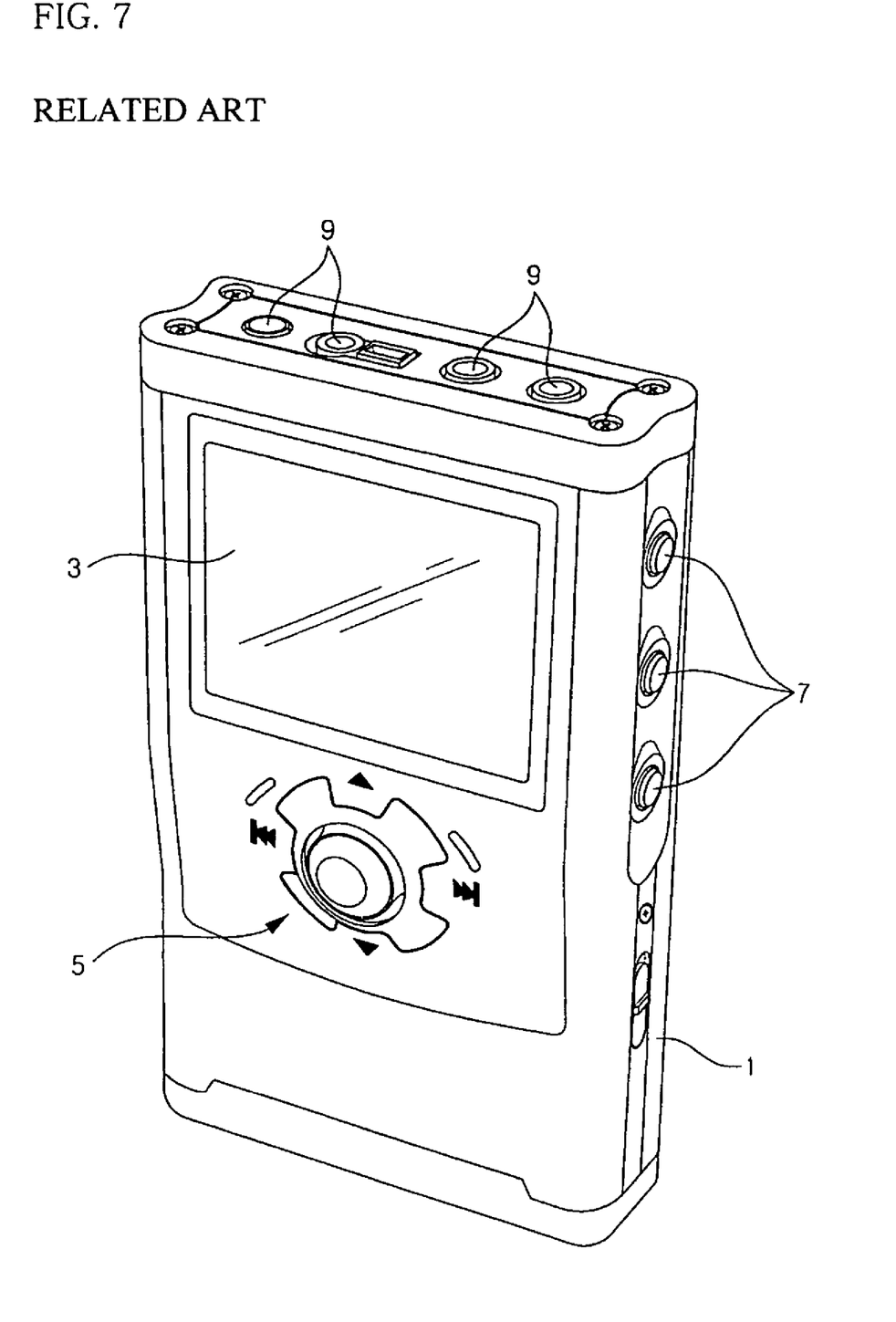
FIG. 7 is a perspective view showing an external appearance of a conventional portable multimedia device.

FIG. 7 is a perspective view showing an external appearance of a related art portable multimedia device. Referring to this figure, a case 1 is generally shaped as a flat hexahedron to form an external appearance of the multimedia device. The case 1 has relatively large front and rear surfaces. The front surface of the case 1 is provided with a display unit 3. The display unit 3 is a portion on which information on the operation of the multimedia device or images produced upon execution of multimedia files are displayed.

A lower portion of the front surface of the case 1 which corresponds to a position below the display unit 3 is provided with a jog button 5. The jog button 5 may be used to perform a desired control according to the moving directions and amounts of the jog button 5 and to perform another desired control when pushed in a state where the jog button 5 is stationarily positioned at the exact center thereof.

A plurality of push buttons 7 are provided on a side surface of the case 1. The push buttons 7 have their respective specific functions. For example, the push buttons can perform the functions of turning on/off of the power, changing the operating mode, and the like. A plurality of connecting jacks 9 are provided on an upper surface of the case 1. The multimedia device can be connected with external devices through the connecting jacks 9. For example, an earphone, a microphone, a remote controller, etc. can be connected with the respective connecting jacks 9.

The related art portable multimedia device so configured is used in such a manner that a user grasps the multimedia device with one hand to operate the jog button 5 or the push buttons 7. In general, the thumb of the right hand of the user is positioned on the front surface of the case 1 to operate the jog button 5, the index finger is used to operate the push buttons 7 provided on the side surface of the case 1, and the remaining three fingers and a portion of the palm are used to grasp the case 1.

However, the related art portable multimedia device as described above has the following problems.

First, if the thumb is used to operate the jog button 5 and the index finger is used to operate the push buttons 7 positioned on the side surface, the remaining three fingers and a portion of the palm should be used to hold and grasp the case 1. Therefore, since the multimedia device cannot be stably held and grasped, the multimedia device may be dropped during the operation and thus be damaged.

In order to solve the problem, in a state where the remaining four fingers except the thumb and the palm are used to hold and grasp the case 1, only the thumb should be moved to operate both the jog button 5 and the push buttons 7. However, there is an inconvenience in that it takes a lot of time to perform such an operation due to a long operating path of the thumb.

Further, since the jog button 5 and the push buttons 7 are individually installed as described above, there is a manufacturing inconvenience in that components of the buttons 5 and 7 should be separately designed and the assembling processes should also be separately performed.

SUMMARY OF THE INVENTION

The present invention is conceived to solve the aforementioned problems in the prior art. An object of the present invention is to provide a complex button assembly having a plurality of buttons capable of performing various functions.

Another object of the present invention is to provide a complex button assembly in which an operation of buttons on one side is not influenced by buttons on the other side.

A further object of the present invention is to provide a portable multimedia device in which a complex button assembly having a plurality of buttons capable of performing various functions is installed such that the operation of the complex button can be easily performed.

In order to accomplish this object, there is provided a complex button assembly for a portable multimedia device, comprising a button frame formed with a penetration portion penetrating through upper and lower surfaces thereof; a button body having a jog window formed in a middle portion of the button body by penetrating through upper and lower surfaces thereof, and first and second button units formed to be elastically deformable at both ends of the button body to respectively operate switches, wherein both sides of the button body between which the jog window is formed are disposed and supported in the penetration portion of the button frame; and a jog button exposed through the jog window of the button body and disposed in the button frame to move in at least one direction and to perform an operation of an additional switch.

Preferably, the penetration portion of the button frame is partitioned by partition ribs, and guide pieces are formed in parallel with the partition ribs on opposite surfaces of the partition ribs, thereby guiding the one directional movement of the jog button.

Preferably, guide ribs provided to both ends of a bottom surface of the jog button are positioned between the guide pieces and the partition ribs.

Preferably, each of the button frame and the jog button has an arcuate cross section, and an upper end of each of the guide pieces is configured as a curved surface corresponding to a bottom surface of the jog button.

Preferably, elastic legs are formed at both sides on a lower surface of a front end of each of the first and second button units in the button body so that the elastic legs extend toward its opposite button unit in parallel with the first and second button units, and a rotating-center pin formed on an inner surface of the penetration portion of the button frame is inserted into a pin hole formed at a front end of each of the elastic legs.

Preferably, seating ribs are formed at both sides of the middle portion of the button body which correspond to the jog window, and supports on which the seating ribs are seated are further provided at both sides of the inner surface of the penetration portion of the button frame.

Preferably, hooking ribs and fastening pieces that are coupled to a case for defining an external appearance of the potable multimedia device are further provided at a lower end of the button frame.

Preferably, fastening ribs are formed at the partition ribs provided to the button frame so that a jog board for mounting the additional switch operated by the jog button thereon can be fastened to the fastening ribs.

In accordance with other aspect of the present invention, there is provided a complex button assembly for a portable multimedia device, the complex button assembly being installed at one side of a case defining an appearance of the portable multimedia device to receive an operating signal, the complex button assembly comprising switches mounted on a main board positioned in the case; a button frame installed to be coupled to the case and having a penetration portion formed by penetrating through upper and lower surfaces thereof; and a button body having both sides of a middle portion thereof installed in and supported by the button frame, and operating the switches by means of elastic deformation of first and second button units provided at both ends of the button body, wherein elastic legs are formed at both sides on a lower surface of a front end of each of the first and second button units provided at the both ends of the button body so that the elastic legs extend from one of the button units toward its opposite button unit in parallel with the first and second button units, and a rotating-center pin formed on an inner surface of the penetration portion of the button frame is inserted into a pin hole formed at a front end of each of the elastic legs.

Preferably, supports for supporting both ends of the middle portion of the button body are further provided inside the button frame.

Preferably, a jog window is further formed in the middle portion of the button body, and the jog window is further provided with a jog button installed in the button frame to move in at least one direction and to perform an operation of an additional switch.

Preferably, the button frame is further provided with partition ribs for partitioning the penetration portion, the partition ribs are provided with guide pieces in parallel, and guide ribs provided at both ends of the jog button are inserted to be movable between the guide pieces and the partition ribs.

Preferably, each of the button frame and the jog button has an arcuate cross section, and an upper end of each of the guide pieces is configured as a curved surface corresponding to a bottom surface of the jog button.

Preferably, the additional switch operated by the jog button is installed on a jog board fastened to the lower surface of the button frame.

In accordance with another aspect of the present invention, there is provided a portable multimedia device comprising: a case having components installed therein and defining an external appearance of the portable multimedia device; a display unit provided on a front surface of the case to display information; and a complex button assembly installed at an upper end of the case to receive a signal required for operation, wherein the complex button assembly is installed to face upwardly on the upper surface of the case or rearwardly and upwardly on the upper surface of the case.

Preferably, the complex button assembly faces rearwardly and upwardly at an angle of less than 45° with respect to a vertical direction of the case when the case is viewed from the side thereof.

Preferably, the complex button assembly includes: a button frame formed with a penetration portion penetrating through upper and lower surfaces thereof, the button frame being mounted in the case; a button body having a jog window formed in a middle portion of the button body by penetrating through upper and lower surfaces thereof, and first and second button units formed to be elastically deformable at both ends of the button body so as to respectively operate switches, wherein both sides of the button body between which the jog window is formed are disposed and supported in the penetration portion of the button frame; and a jog button exposed through the jog window of the button body and disposed in the button frame to move in at least one direction and to perform an operation of an additional switch.

Preferably, the penetration portion of the button frame is partitioned by partition ribs, and guide pieces are formed in parallel with the partition ribs on opposite surfaces of the partition ribs, thereby guiding guide ribs provided at both ends of the jog button.

Preferably, elastic legs are formed at both sides on a lower surface of a front end of each of the first and second button units in the button body so that the elastic legs extend toward its opposite button unit in parallel with the first and second button units, and a rotating-center pin formed on an inner surface of the penetration portion of the button frame is inserted into a pin hole formed at a front end of each of the elastic legs.

Preferably, seating ribs are formed at both sides of the middle portion of the button body which correspond to the jog window, and supports on which the seating ribs are seated are further provided at both sides of the inner surface of the penetration portion of the button frame.

According to the present invention, since the buttons having various functions are integrated onto one side of the multimedia device, it is easy for a user to operate the multimedia device. Further, since the button assembly is designed such that the operation of the respective buttons can be independently performed, the operation of buttons on one side cannot be influenced by buttons on the other side. Thus, the operating reliability of the final products can be improved.

In addition, since a user holds and grasps the portable multimedia device of the present invention with one hand to perform a variety of operations, there is an advantage in that the user's convenience can be improved.

DETAILED DESCRIPTION OF THE INVENTION

Hereinafter, preferred embodiments of a complex button assembly and a portable multimedia device using the same according to the present invention will be described in detail with reference to the accompanying drawings.

Figure 1:
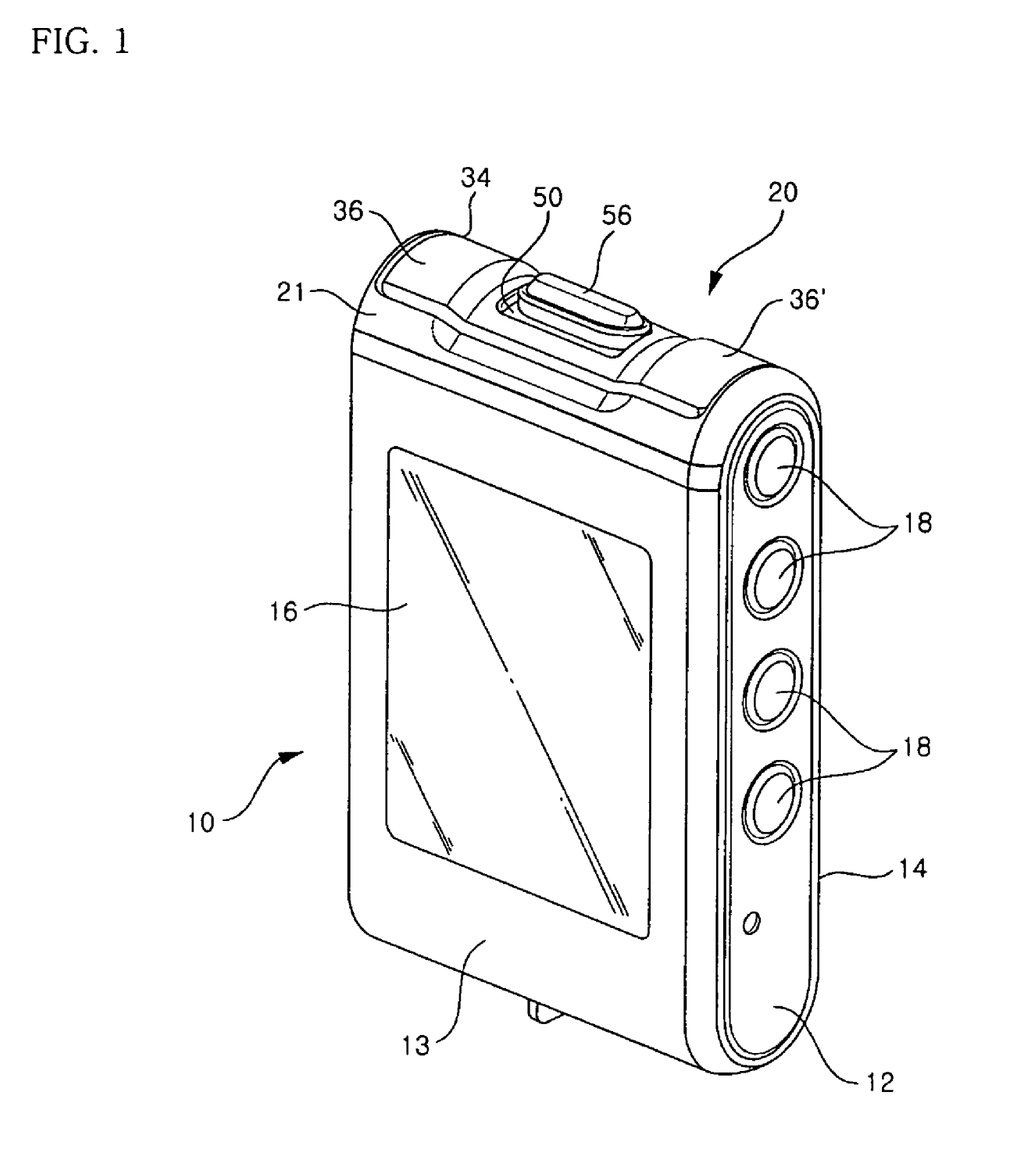
FIG. 1 is a perspective view showing an external appearance of an embodiment of a portable multimedia device according to the present invention.
Figure 2:
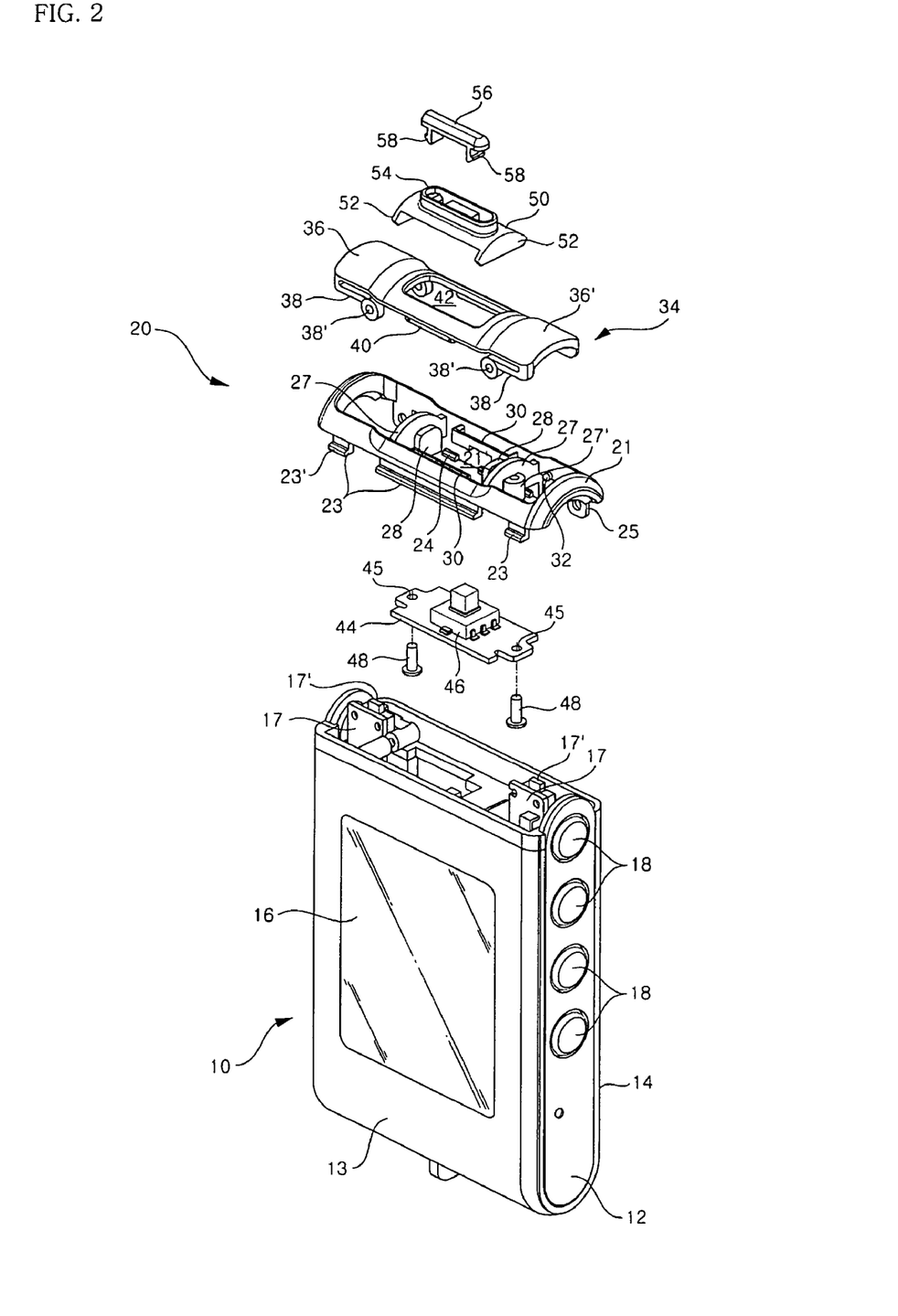
FIG. 2 is an exploded perspective view showing an exploded state where a complex button assembly is separated from a case according to the embodiment of the present invention.

Referring to FIGS. 1 and 2, a case 10 is generally shaped as a flat hexahedron. The case 10 has relatively large front and rear surfaces each of which is generally shaped as a rectangle.

Both side surfaces of the case 10 are planar, whereas upper and lower surfaces of the case 10 are curved with predetermined curvatures.

The case 10 includes a frame 12, a front face plate 13 and a rear face plate 14. The frame 12 defines a framework of the case 10 and an external appearance of both side surfaces thereof. The front face plate 13 is mounted to the frame 12 to define the front surface of the case 10 and a portion of the lower surface thereof. The rear face plate 14 is mounted to the frame 12 to define the rear surface of the case 10 and a portion of the lower surface thereof. Therefore, lower ends of the front and rear face plates 13 and 14 become curved surfaces with predetermined curvatures.

For reference, the configuration of the case 10 is not necessarily identical to that of the illustrated embodiments. That is, the substantially flat hexahedral shape would be good enough for the case 10. For example, the lower surfaces are not necessarily a curved surface.

On the front surface of the case 10 is provided a display unit 16. The display unit 16 is configured by a liquid crystal display panel, for example, provided within the case 10, in such a manner that a portion of the front face plate 13 is made transparent to allow contents displayed on the liquid crystal display panel to be shown through the front surface of the case 10. Operating information on the multimedia device or images produced upon execution of multimedia files are displayed on the display unit 16.

A main board 17 is installed within the case 10. The main board 17 is installed parallel with the front and rear face plates 13 and 14, and can be fixed directly to the frame 12 or fixed to the liquid crystal display panel and then mounted to the frame 12. The main board 17 is provided with a switch 17' operated by first and second button units 36 and 36' which will be described later.

A plurality of push buttons 18 can be provided on one side surface of the case 10. The push buttons 18 serve to perform various kinds of functions of the multimedia device. Switches (not shown) to be operated by the push buttons 18 are also mounted to the main board 17.

A complex button assembly 20 is provided to define an upper surface of the case 10. The complex button assembly 20 is provided at an upper end of the case 10 to receive various kinds of instructions for operating the multimedia device. The configuration of the complex button assembly 20 will be described in detail with reference to FIG. 2.

A button frame 21 serves to define a framework of the complex button assembly 20. The button frame 21 also serves to define an external appearance of the upper surface of the case 10. The button frame 21 is generally shaped as a rectangle, is formed with a penetration portion 21' which penetrates the button frame 21 in a vertical direction, and is mounted to the upper end of the case 10.

Hereinafter, the configuration for mounting the button frame 21 to the case 10 will be described. A plurality of hooking ribs 23 are provided to specific portions of the button frame 21 which face the front face plate 13. The hooking ribs 23 are caught to an upper rear surface of the front face plate 13. To this end, catching jaws 23' are provided at tip ends of the hooking ribs 23. Of course, the front face plate 13 is provided with constitutional features to which the hooking ribs 23 are caught.

Other hooking ribs 24 are provided to other specific portions of the button frame 21 which face a rear end of the frame 12. The hooking ribs 24 are portions which are caught to the frame 12. A plurality of fastening pieces 25 are formed to portions of the button frame 21 which face the rear face plate 14. The fastening pieces 25 are portions through which fastening screws (not shown) are penetrated to fasten the rear face plate 14 to the frame 12.

Partition ribs 27 are provided to partition the penetration portion 21'. Two partition ribs 27 are used to partition the penetration portion 21' into three spaces. The partition ribs 27 are provided with fastening ribs 27', respectively. The fastening ribs 27' are formed respectively on surfaces of the partition ribs 27 which do not face each other.

Guide pieces 28 are formed respectively on surfaces of the partition ribs 27 which face each other. The guide pieces 28 are formed in parallel with the partition ribs 27, respectively. Lower ends of the guide pieces 28 are integrally formed with the partition ribs 27, respectively, and the remaining portions thereof are parallel with and spaced apart from the partition ribs 27 by a certain gap. Upper ends of the guide pieces 28 are rounded. It serves to guide a movement of a jog button 50 which will be described below.

Opposite supports 30 are formed on inner surfaces of the button frame 21 between the partition ribs 27. The supports 30 serve to support a button body 34 which will be described below.

Rotating-center pins 32 are installed on the inner surfaces of the button frame 21 between both ends of the button frame 21 and the partition ribs 27 near to the partition ribs 27, respectively. The rotating-center pins 32 protrude from the inner surfaces of the button frame 21 to face each other. In this embodiment of the present invention, total four rotating-center pins 32 are provided. The rotating-center pins 32 will become reference points of the elastic deformation of the button body 34 which will be described below.

The button body 34 is seated into the penetration portion 21' of the button frame 21. The button body 34 is shaped as an arch with a predetermined curvature as viewed form the side surface thereof. Both ends of the button body 34 are provided with first and second button units 36 and 36', respectively. The first and second button units 36 and 36' are formed to be symmetric with each other. The first and second button units 36 and 36' are portions which are pushed down by a user to operate the switches 17', respectively.

Elastic legs 38 are integrally formed with both sides of a lower tip end of the first or second button unit 36 or 36', respectively. The elastic legs 38 extend from the lower tip ends of the first or second button unit 36 or 36' toward respective opposite button unit 36' or 36. Each of the elastic legs 38 may be elastically deformed because of its intrinsic characteristics in view of their materials and shapes. An end of the elastic leg 38 is provided with a pin hole 38' through which the rotating-center pin 32 is penetrated. If the first or second button unit 36 or 36' is pressed in a state where the rotating-center pins 32 are inserted into and supported by the pin holes 38', the elastic legs 38 are elastically deformed such that the first or second button unit 36 or 36' can relatively descend to push down the switches 17'.

Accordingly, the button units 36 and 36' of the button body 34 can be elastically deformed with respect to the rotating-center pins 32 inserted into the pin holes 38'. That is, the elastic deformation is initiated from the rotating-center pins 32 and is then produced on the button units 36 and 36' at both ends of the button body 34. In other words, the rotating-center pins 32 serve to cooperate with seating ribs 40 and to cause one of the button units 36 and 36' not to be elastically deformed when the other of the button units 36 and 36' is pressed and then elastically deformed.

Furthermore, when the first button unit 36 is pressed to be elastically deformed, the rotating-center pins 32 positioned at the side of the second button unit 36' serve to support the second button unit 36' such that the second button unit 36' cannot excessively protrude from the penetration portion 21' of the button frame 21.

To both sides of a lower end of a middle portion of the button body 34 are formed the seating ribs 40 which seat on the supports 30 of the button frame 21. The seating ribs 40 serve to allow one of the button units 36 and 36' not to be elastically deformed even though the other of the button units 36 and 36' is pushed down in a state where the button body 34 is supported on the button frame 21.

A jog window 42 is formed in a central portion of the button body 34. The jog window 42 is formed by vertically penetrating the button body 34 and is generally shaped as a rectangle. The jog window 42 communicates with a space defined between the partition ribs 27 of the button frame 21. However, the jog window 42 has a relatively smaller area than the space between the partition ribs 27. That is, the shape and area of the jog window 42 is determined such that an edge of the space defined by peripheries of the partition ribs 27 and the button frame 21 can be encompassed. It is to allow the jog button 50, which will be described later, not only to be exposed to the outside through the jog window 42 but also not to be detached from the jog window 42.

A jog board 44 is mounted to the button frame 21. Fastening holes 45 are perforated through both ends of the jog board 44. The fastening holes 45 are formed at positions corresponding to the fastening ribs 27' of the button frame 21. A switch 46 is mounted to the jog board 44. The switch 46 is operated by the jog button 50 which will be described later. The jog board 44 is fastened to the fastening ribs 27' of the button frame 21 by means of a fastening screw 48. For reference, the switch 46 may be mounted to the main board 17 without additionally using the jog board 44.

The jog button 50 is used to operate the switch 46 and is installed between the button frame 21 and the button body 34 such that a portion of the jog button 50 can be exposed to the outside through the jog window 42. Guide ribs 52 are formed on both ends of a bottom surface of the jog button 50. The guide ribs 52 are positioned between the partition ribs 27 and the guide pieces 28. The jog button 50 has a side section which is substantially shaped as an arch, and particularly, the bottom surface of the jog button 50 has a curved surface corresponding to that of the upper end of the guide piece 28. Accordingly, the jog button 50 can be moved toward the front and rear of the case 10 with respect to the button body 34 and can be pressed down at the central region thereof in order to operate the switch 46 such that predetermined operating instructions can be received.

Of course, the jog button 50 may be designed to move in four directions (toward front, rear and both sides thereof) with respect to the button body 34. In this case, the switch 46 capable of detecting such an operation should be employed.

A protrusion seating portion 54 is formed on a top surface of the jog button 50. The protrusion seating portion 54 is formed to protrude from the top surface of the jog button 50. A hooking protrusion 56 is installed into the protrusion seating portion 54. The hooking protrusion 56 allows a user to easily operate the jog button 50. Catching hooks 58 are provided to both ends of a bottom surface of the hooking protrusion 56. The hooking hook 58 serves to fix the hooking protrusions 56 to the protrusion seating portion 54. Of course, the hooking protrusion 56 may be integrally formed with the top surface of the jog button 50.

Figure 5:
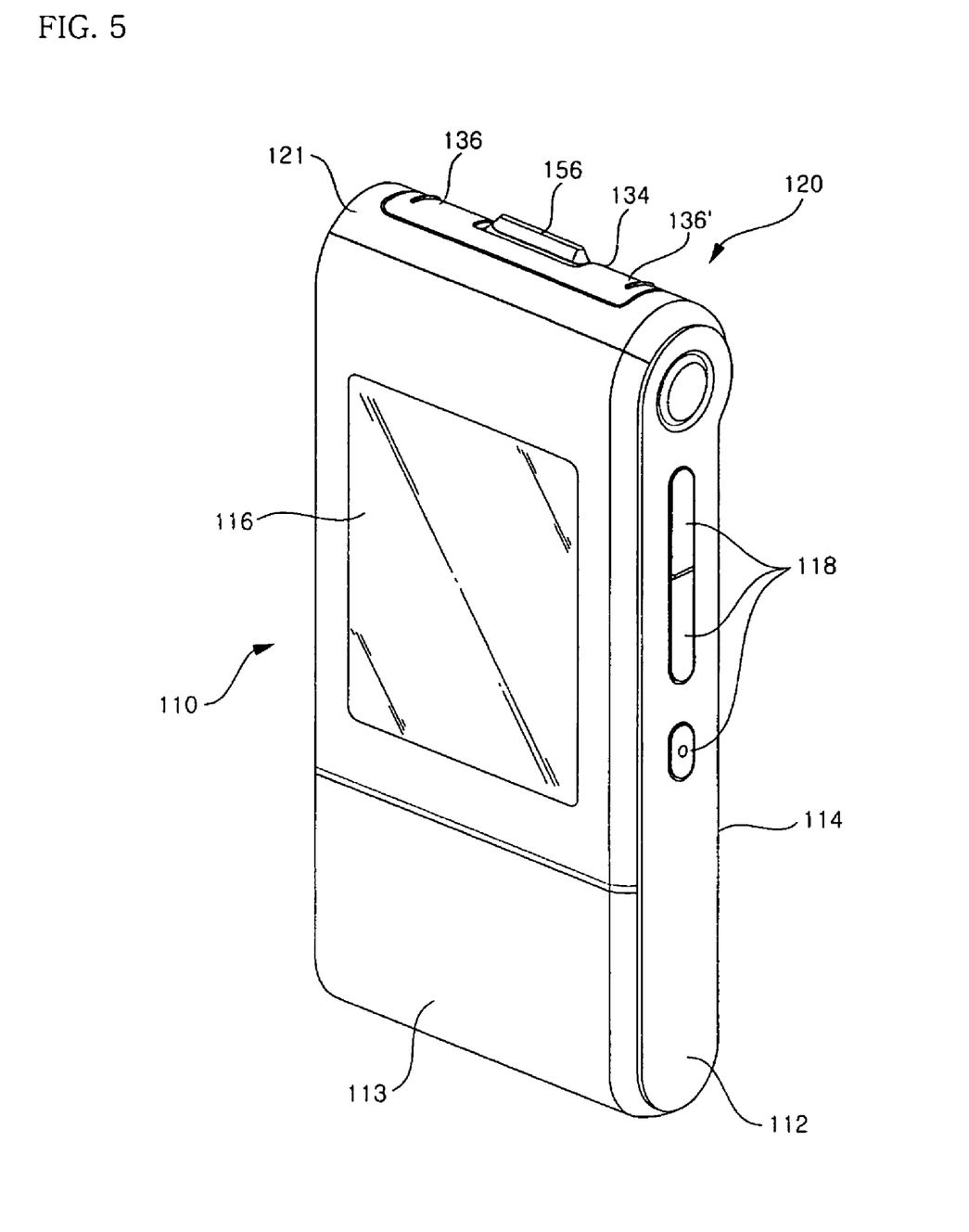
FIG. 5 is a perspective view showing the configuration according to another embodiment of the present invention.
Figure 6:
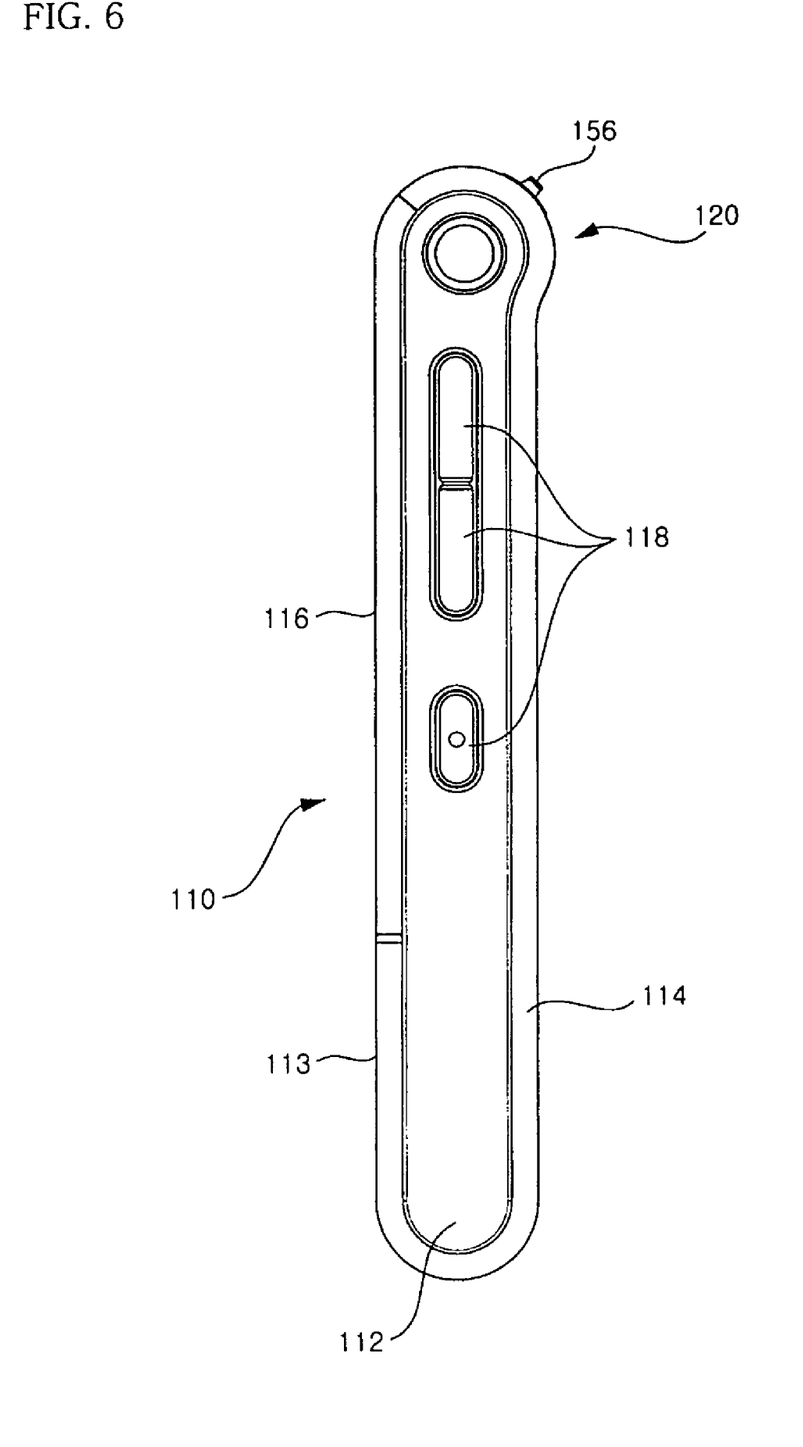
FIG. 6 is a side view of the embodiment shown in FIG. 5.

Meanwhile, although it has been illustrated in the embodiment shown in FIG. 1 that the complex button assembly 20 is provided on the upper surface of the case 10 perpendicular to the front surface of the case 10 on which the display unit 16 is provided, another embodiment is illustrated in FIGS. 5 and 6. In this embodiment, the constitutional components corresponding to those of the previous embodiment shown in FIG. 1 are designated by reference numerals increased by one hundred, and only main portions thereof will be described herein for the sake of convenience.

According to this embodiment of the present invention, a complex button assembly 120 is obliquely mounted to an upper surface of a case 110 perpendicular to a front surface of the case 110 at a predetermined angle toward the rear of a case 110. That is, if the case 110 is viewed from the side, a button body 134 and a jog button 150 of the complex button assembly 120 are installed to face rearwardly and upwardly on the upper surface of the case 110.

Of course, the inner configuration of the complex button assembly 120 are identical with those of the previous embodiment as describe above, but the complex button assembly 120 is installed to face rearwardly and upwardly on the upper surface of the case 110. That is, the complex button assembly 120 is mounted to be inclined to the rear of the case 110 as compared with the assembly of the previous embodiment. As viewed from the side of the case 110, an inclined angle of the complex button assembly 120 is preferably less than about 45° with respect to a vertical direction of the case 110.

It is preferred that this embodiment be used when the case 110 is relatively larger than that of the previous embodiment shown in FIG. 1. That is, in order to stably hold or support the larger case 110 on the palm of the user, an upper end of the case 110 should be positioned near to a root portion of the user's index finger.

However, if the complex button assembly 120 is installed to face rearwardly and upwardly on the upper surface of the case 110, the user will be able to operate the complex button assembly 120 without bending his/her index finger too much.

Hereinafter, the operation of the complex button assembly of the portable multimedia device according to the present invention will be described in detail.

First, a process of assembling the complex button assembly 20 will be described. The jog board 44 mounted with the switch 46 is fastened to a bottom surface of the button frame 21. That is, the fastening screws 48 which have penetrated the fastening holes 45 of the jog board 44 are fastened to the fastening ribs 27' of the button frame 21, respectively.

Next, the jog button 50 is seated on the button frame 21. At this time, a movable portion of the switch 46 is fitted into a recess (not shown) provided in the bottom surface of the jog button 50. At this time, the guide ribs 52 provided at both ends of the jog button 50 are positioned between partition ribs 27 and the guide pieces 28, and the curved surface of the upper end of the guide piece 28 corresponds to the curved surface of the bottom surface of the jog button 50. For reference, the hooking protrusion 56 has been already coupled to the protrusion seating portion 54 of the jog button 50, or the hooking protrusion 56 may be coupled thereto later.

The button body 34 is connected to the button frame 21 to which the jog button 50 has been already mounted. That is, the button body 34 is seated onto the penetration portion 21' of the button frame 21 from above the button frame 21. At this time, the rotating-center pins 32 are connected to the elastic legs 38 of the button body 34. That is, the rotating-center pins 32 are inserted into the pin holes 38' of the elastic legs 38, respectively. Furthermore, the seating ribs 40 of the button body 34 are placed onto the supports 30 of the button frame 21.

Such a process of assembling the complex button assembly 20 is performed in advance before the complex button assembly 20 has been sent to a main assembly line. Accordingly, the complex button assembly 20 will be merely mounted to the upper end of the case 10 in the main assembly line.

That is, the hooking ribs 23 of the button frame 21 are caught to the upper ends of the rear surface of the front face plate 13, and simultaneously, the fastening pieces 25 are also fastened when the rear face plate 14 is fastened to the frame 12. At this time, the first and second button units 36 and 36' of the complex button assembly 20 is in a state where the switches 17' of the main board 17 can be operated.

Figure 3:
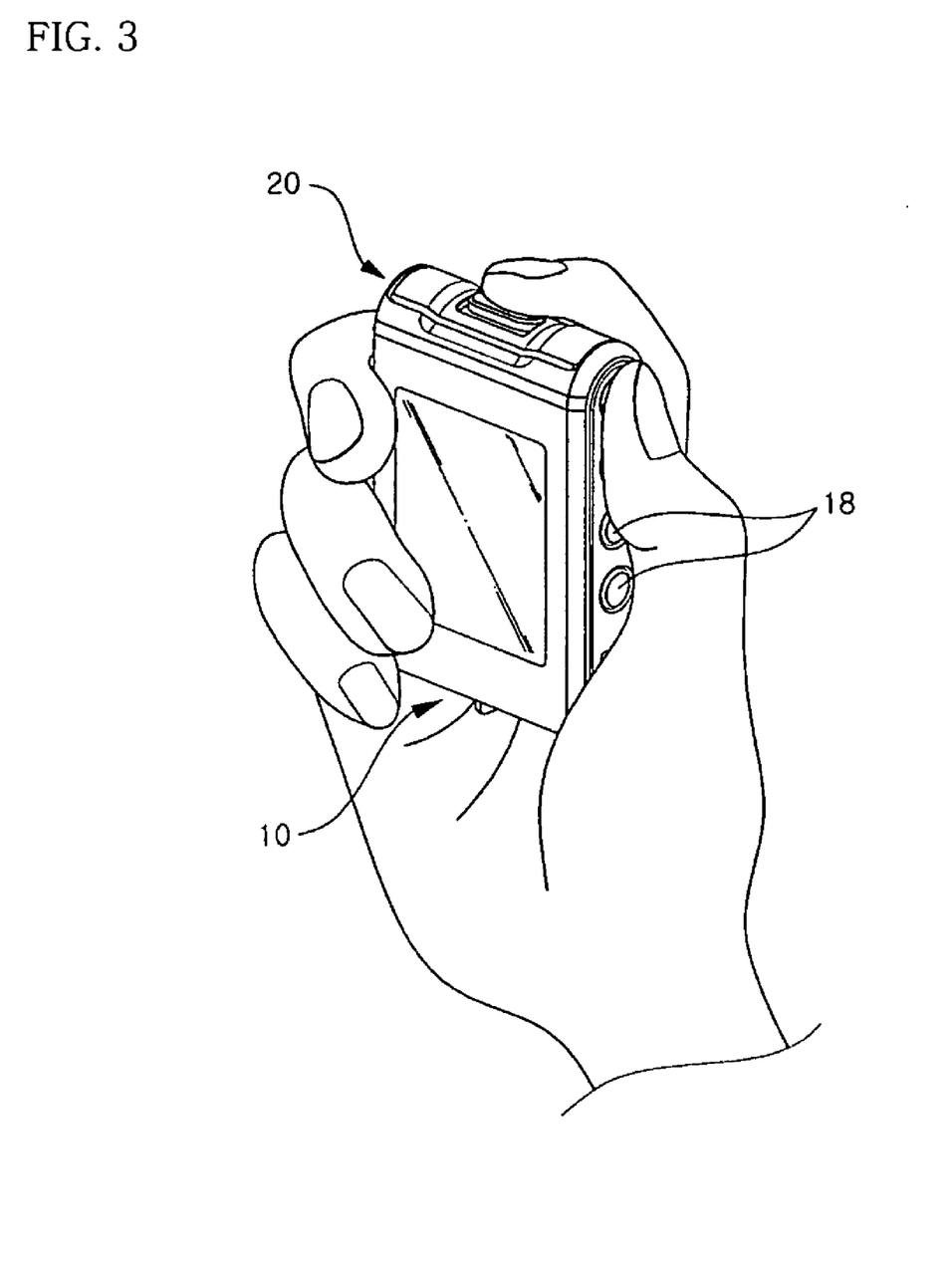
FIG. 3 is a view showing an operating state where a user holds and operates the multimedia device according to the embodiment of the present invention.
Figure 4A:
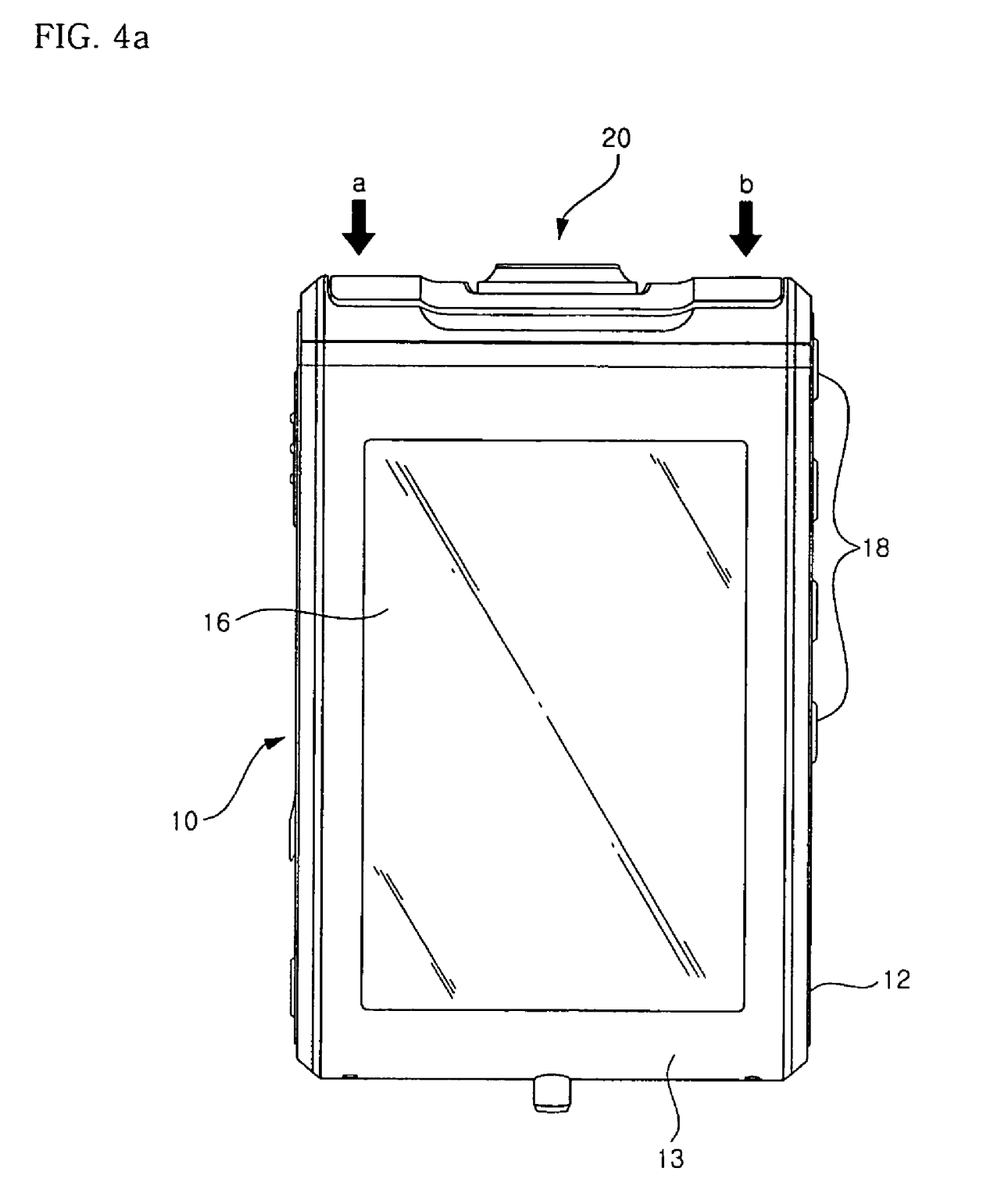
FIG. 4a is a view explaining how to operate a push button unit of a button body according to the embodiment of the present invention.
Figure 4B:
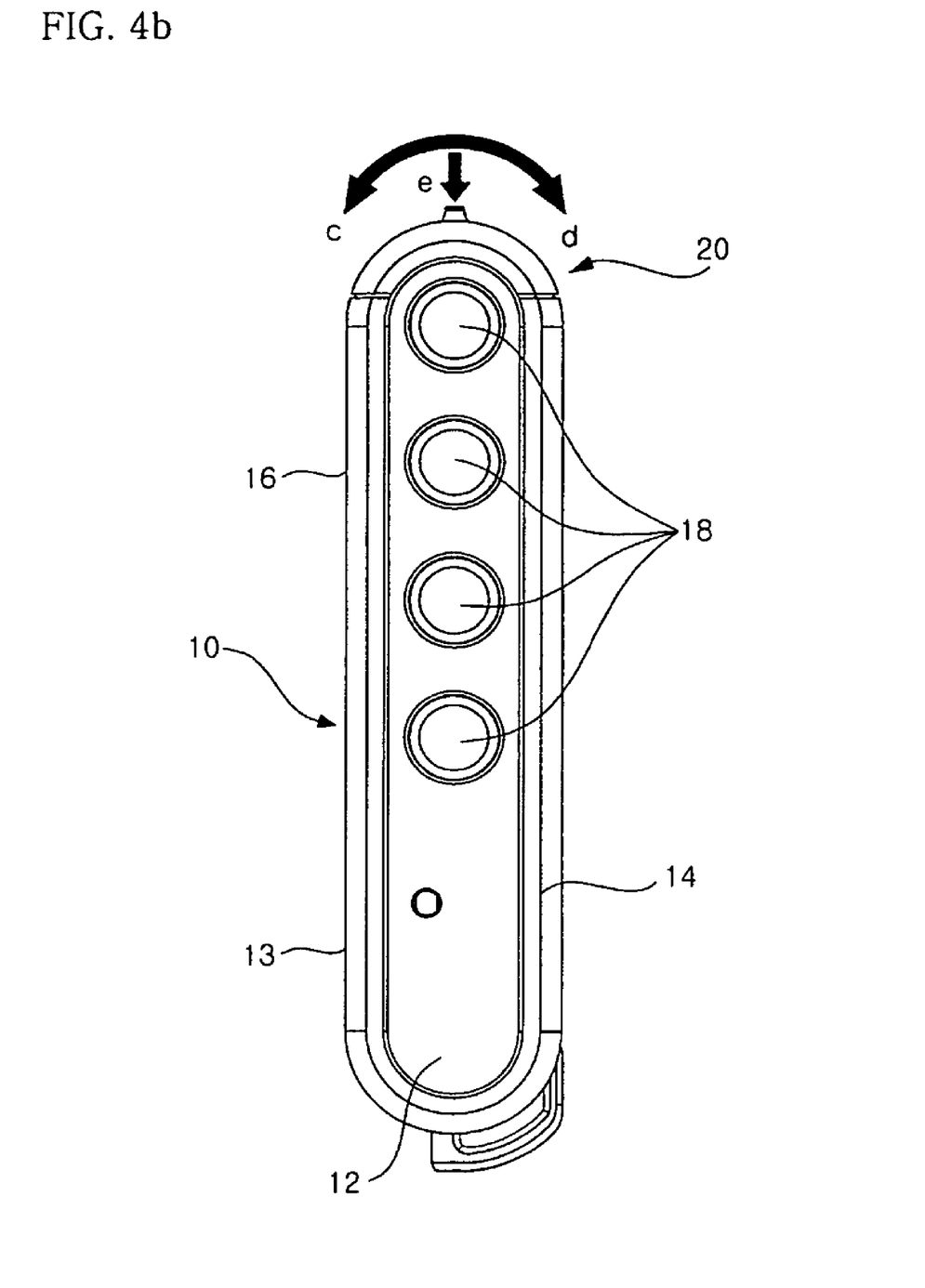
FIG. 4b is a view explaining how to operate a jog button according to the embodiment of the present invention.

A process of operating the complex button assembly 20 completely mounted to the portable multimedia device as described above will be described with reference to FIGS. 3 and 4. The complex button assembly 20 of the present invention can be applied to the portable multimedia device. That is, as shown in FIG. 3, the complex button assembly 20 of the present invention can be efficiently used in the portable multimedia device of which case 10 can be grasped with one hand of a user.

The user can support a half of the case 10 using the palm of the user's hand, operate the complex button assembly 20 with the user's index finger, and also operate the push buttons 18 with the user's thumb. Such a state is well shown in FIG. 3.

At this time, the index finger can push down the first and second button units 36 and 36' of the button body 34 to operate the switches 17'. The directions in which the first and second button units 36 and 36' are pushed down are well shown as arrows 'a' and 'b' in FIG. 4a.

Hereinafter, the operation of the button units 36 and 36' will be described in detail. If the user pushes down the button unit 36 or 36', an end of the button unit 36 or 36' is pushed down such that the elastic legs 38 can be pressed and elastically deformed.

However, since the rotating-center pins 32 are inserted into the tip ends of the elastic legs 38, portions of the elastic legs 38 which are connected to the button body 34 are elastically deformed with respect to the rotating-center pins 32. Such deformation allows the button units 36 and 36' to operate the switches 17'. Further, if the user removes the force applied to the button unit 36 or 36', the button unit 36 or 36' and the elastic legs 38 may be restored to their original shapes.

In addition, the button body 34 is placed onto the supports 30 of the button frame 21, and in particular, the seating ribs 40 corresponding to the middle portion of the button body 34 are placed onto the supports 30 of the button frame 21. Accordingly, even though one of the button units 36 and 36' is elastically deformed, the other of the button units 36 and 36' are no longer influenced by the deformed button unit, particularly since the centers around which the elastic legs 38 of the button unit 36 or 36' are elastically deformed are independent of each other.

Meanwhile, the index finger can be used to operate the jog button 50 exposed through the jog window 42 of the button body 34. As shown in FIG. 4b, the jog button 50 can be moved in the front direction (designated by an arrow 'c') or rear direction (designated by an arrow 'd') of the case 10. The jog button 50 can be moved in such a way since the jog button 50 is guided by the guide piece 28 installed in the button frame 21. Of course, the movable portion of the switch 46 should be configured such that it can be moved in such a manner.

Meanwhile, the jog button 50 can also be operated in a direction (designated by an arrow 'e' shown in FIG. 4b) in which the switch 46 is vertically pushed down. That is, if the user pushes down the top surface of the jog button 50, the movable portion of the switch 46 is directly pressed by the jog button 50.

Further, the process of operating the complex button assembly 120 in the embodiment of FIG. 5 is identical with that in the embodiment of in FIG. 1. Since the complex button assembly 120 is installed to face rearward and upwardly on the case, the index finger can have an easy access to the complex button assembly 120 even though the case 110 is relatively large.

The scope and sprit of the present invention are not limited to the embodiments as described above, but are defined by the appended claims. It is apparent to those skilled in the art that various modifications and changes can be made thereto without departing from the scope and spirit of the present invention.

For reference, although the complex button assembly 20 with the jog button 50 formed therein has been described in the illustrated embodiments, the complex button assembly 20 can be configured without using the jog button 50. In such a case, the jog button 50 and the jog board 44 should be eliminated and the jog window 42 should be covered. Accordingly, the complex button assembly 20 in which each of the button units 36 and 36' can be pushed down while receiving two operations can be provided.

The complex button assembly and the portable multimedia device having the same according to the present invention as described in detail can provide the following advantages.

First, since the complex button assembly which has been previously assembled can be provided to the main assembly line, the efficiency of assembling the portable multimedia device can be relatively improved.

Further, even though the button units formed at both ends of the button body are operated in a single complex button assembly according to the present invention, elastic deformation of one of the button units has no influence on the other of the button units. Accordingly, the operating reliability of the complex button assembly can be improved.

In addition, since the push buttons and the jog button can be integrated into a single assembly, a plurality of buttons having various functions can be integrated into a single complex button assembly, whereby the user's convenience can be improved.

Finally, when the complex button assembly is installed at the upper end of the case, the assembly can be installed to face upwardly on the upper surface of the case or rearwardly and upwardly on the upper surface of the case depending on the size of the case. Accordingly, the user can operate a variety of buttons using the index finger and the thumb of the user while stably holding or supporting the multimedia device using one hand. Therefore, the user's convenience can be further improved.

The invention claimed is:

1. A complex button assembly for a portable multimedia device, comprising:
    a button frame formed with a penetration portion penetrating through upper and lower surfaces thereof;
    a button body having a jog window formed in a middle portion of the button body by penetrating through upper and lower surfaces thereof, and first and second button units formed to be elastically deformable at both ends of the button body to respectively operate switches, wherein both sides of the button body between which the jog window is formed are disposed and supported in the penetration portion of the button frame; and
    a jog button exposed through the jog window of the button body and disposed in the button frame to move in at least one direction and to perform an operation of an additional switch.

2. The complex button assembly as claimed in claim 1, wherein the penetration portion of the button frame is partitioned by partition ribs, and guide pieces are formed in parallel with the partition ribs on opposite surfaces of the partition ribs, thereby guiding one directional movement of the jog button.

3. The complex button assembly as claimed in claim 2, wherein guide ribs provided to both ends of a bottom surface of the jog button are positioned between the guide pieces and the partition ribs.

4. The complex button assembly as claimed in claim 2, wherein each of the button frame and the jog button has an arcuate cross section, and an upper end of each of the guide pieces is configured as a curved surface corresponding to a bottom surface of the jog button.

5. The complex button assembly as claimed in claim 1, wherein elastic legs are formed at both sides on a lower surface of a front end of each of the first and second button units in the button body so that the elastic legs extend toward its opposite button unit in parallel with the first and second button units, and a rotating-center pin formed on an inner surface of the penetration portion of the button frame is inserted into a pin hole formed at a front end of each of the elastic legs.

6. The complex button assembly as claimed in claim 5, wherein seating ribs are formed at both sides of the middle portion of the button body which correspond to the jog window, and supports on which the seating ribs are seated are further provided at both sides of the inner surface of the penetration portion of the button frame.

7. The complex button assembly as claimed in claim 1, wherein hooking ribs and fastening pieces that are coupled to a case for defining an external appearance of the potable multimedia device are further provided at a lower end of the button frame.

8. The complex button assembly as claimed in claim 1, wherein fastening ribs are formed at the partition ribs provided to the button frame so that a jog board for mounting the additional switch operated by the jog button thereon can be fastened to the fastening ribs.

9. A complex button assembly for a portable multimedia device, the complex button assembly being installed at one side of a case defining an appearance of the portable multimedia device to receive an operating signal, the complex button assembly comprising:
  switches mounted on a main board positioned in the case;
  a button frame installed to be coupled to the case and having a penetration portion formed by penetrating through upper and lower surfaces thereof; and
  a button body having both sides of a middle portion thereof installed in and supported by the button frame, and operating the switches by elastic deformation of first and second button units provided at both ends of the button body,
  wherein elastic legs are formed at both sides on a lower surface of a front end of each of the first and second button units provided at the both ends of the button body so that the elastic legs extend from one of the button units toward its opposite button unit in parallel with the first and second button units, and a rotating-center pin formed on an inner surface of the penetration portion of the button frame is inserted into a pin hole formed at a front end of each of the elastic legs.

10. The complex button assembly as claimed in claim 9, wherein supports for supporting both ends of the middle portion of the button body are further provided inside the button frame.

11. The complex button assembly as claimed in claim 10, wherein a jog window is further formed in the middle portion of the button body, and the jog window is further provided with a jog button installed in the button frame to move in at least one direction and to perform an operation of an additional switch.

12. The complex button assembly as claimed in claim 11, wherein the button frame is further provided with partition ribs for partitioning the penetration portion, the partition ribs are provided with guide pieces in parallel, and guide ribs provided at both ends of the jog button are inserted to be movable between the guide pieces and the partition ribs.

13. The complex button assembly as claimed in claim 12, wherein each of the button frame and the jog button has an arcuate cross section, and an upper end of each of the guide pieces is configured as a curved surface corresponding to a bottom surface of the jog button.

14. The complex button assembly as claimed in claim 13, wherein the additional switch operated by the jog button is installed on a jog board fastened to the lower surface of the button frame.

15. The portable multimedia device as claimed in claim 14, wherein the complex button assembly includes:
  a button frame formed with a penetration portion penetrating through upper and lower surfaces thereof, the button frame being mounted in the case;
  a button body having a jog window formed in a middle portion of the button body by penetrating through upper and lower surfaces thereof, and first and second button units formed to be elastically deformable at both ends of the button body so as to respectively operate switches, wherein both sides of the button body between which the jog window is formed are disposed and supported in the penetration portion of the button frame; and
  a jog button exposed through the jog window of the button body and disposed in the button frame to move in at least one direction and to perform an operation of an additional switch.

16. The portable multimedia device as claimed in claim 15, wherein the penetration portion of the button frame is partitioned by partition ribs, and guide pieces are formed in parallel with the partition ribs on opposite surfaces of the partition ribs, thereby guiding guide ribs provided at both ends of the jog button.

17. The portable multimedia device as claimed in claim 15, wherein elastic legs are formed at both sides on a lower surface of a front end of each of the first and second button units in the button body so that the elastic legs extend toward its opposite button unit in parallel with the first and second button units, and a rotating-center pin formed on an inner surface of the penetration portion of the button frame is inserted into a pin hole formed at a front end of each of the elastic legs.

18. The portable multimedia device as claimed in claim 17, wherein seating ribs are formed at both sides of the middle portion of the button body which correspond to the jog window, and supports on which the seating ribs are seated are further provided at both sides of the inner surface of the penetration portion of the button frame.

* * * * *